(12) United States Patent
Archer et al.

(10) Patent No.: US 9,104,444 B2
(45) Date of Patent: Aug. 11, 2015

(54) MOBILE APPLICATION CONFIGURATION

(75) Inventors: Donald Gene Archer, Euless, TX (US); Vinod K. Menon, Elkridge, MD (US); Andrien John Wang, Keller, TX (US); William Dwayne York, Saginaw, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 480 days.

(21) Appl. No.: 13/307,063

(22) Filed: Nov. 30, 2011

(65) Prior Publication Data

US 2013/0139126 A1 May 30, 2013

(51) Int. Cl.
*G06F 9/44* (2006.01)
*G06F 9/445* (2006.01)
*G06F 11/36* (2006.01)

(52) U.S. Cl.
CPC ........ *G06F 9/44505* (2013.01); *G06F 11/3664* (2013.01); *G06F 8/60* (2013.01); *G06F 11/3672* (2013.01)

(58) Field of Classification Search
CPC ............... G06F 8/20; G06F 8/36; G06F 8/61; G06F 8/71; G06F 9/44505; G06F 11/36; G06F 11/3664; G06F 11/3668; G06F 11/3672; G06F 11/3696
USPC .......................................................... 717/121
See application file for complete search history.

(56) References Cited

U.S. PATENT DOCUMENTS

| | | | |
|---|---|---|---|
| 7,809,988 B1 * | 10/2010 | Portal et al. ................. | 714/38.13 |
| 8,406,809 B2 * | 3/2013 | Florek et al. .................. | 455/558 |
| 2005/0289536 A1 * | 12/2005 | Nayak et al. .................. | 717/174 |
| 2005/0289538 A1 * | 12/2005 | Black-Ziegelbein et al. . | 717/177 |
| 2008/0320468 A1 * | 12/2008 | Ferris et al. .................... | 717/174 |
| 2009/0094527 A1 * | 4/2009 | Parupudi et al. .............. | 715/744 |
| 2009/0177684 A1 * | 7/2009 | Williamson .............. | 707/103 R |
| 2011/0093836 A1 * | 4/2011 | Galicia et al. ................. | 717/139 |
| 2011/0131549 A1 * | 6/2011 | Bozak et al. ................... | 717/121 |
| 2011/0145789 A1 * | 6/2011 | Rasch et al. ................... | 717/121 |
| 2011/0217968 A1 * | 9/2011 | Korkalo et al. ............... | 455/418 |
| 2012/0311309 A1 * | 12/2012 | Fillipi et al. ...................... | 713/1 |

* cited by examiner

*Primary Examiner* — Qing Chen
*Assistant Examiner* — Andrew M Lyons

(57) ABSTRACT

A user device receives a mobile application that defines multiple environments associated with the mobile application and launches the mobile application. After the launching the mobile application, the user device retrieves an environment selector value for the mobile application and initializes the mobile application with configuration data for a particular environment of the multiple environments. The particular environment is selected from the multiple environments based on the environment selector value.

20 Claims, 7 Drawing Sheets

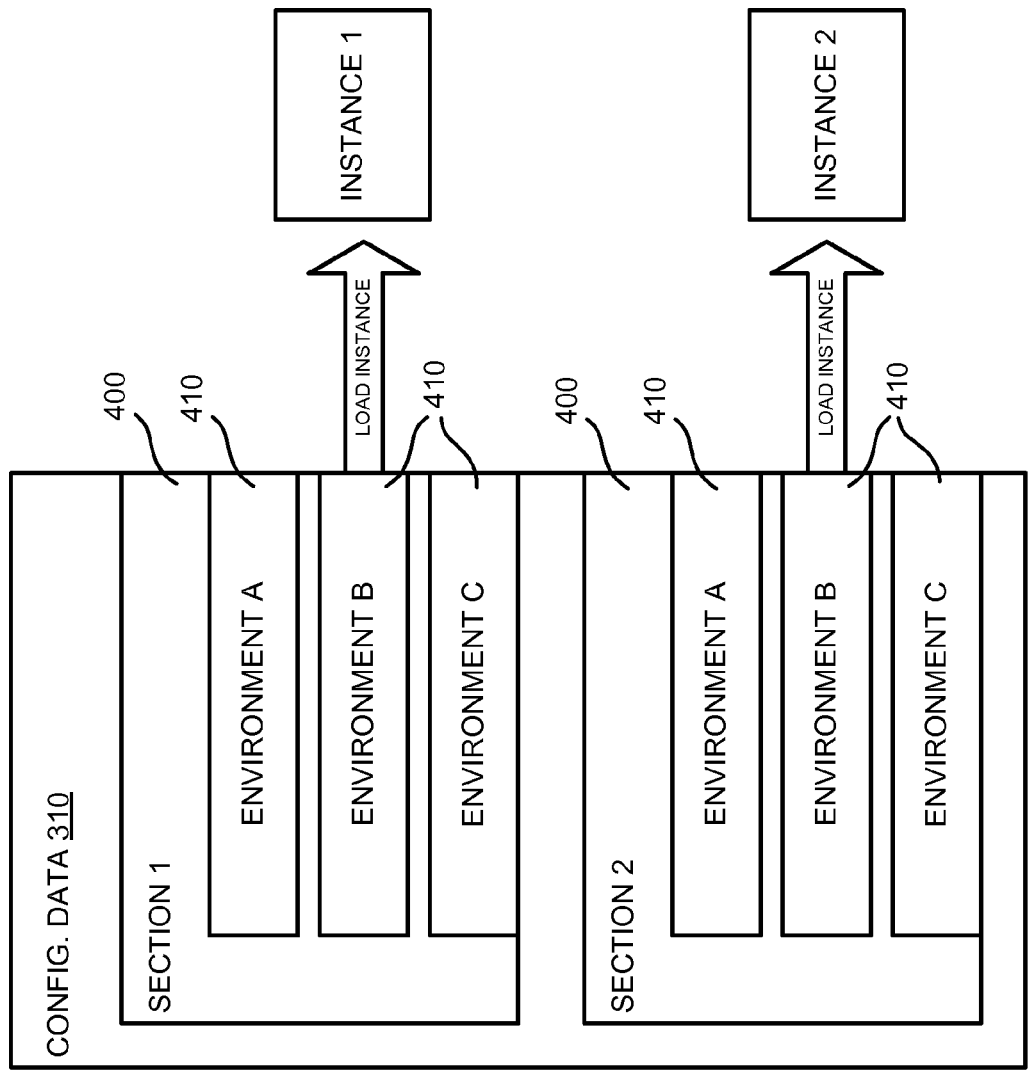

```xml
<?xml version="1.0" encoding="utf-8"?>
<config>
<section name="com.provider.ads.Config">
<env name="prod">
<field name="urlFormat" value="someprodurl"/>
</env>
<env name="stage">
<field name="urlFormat" value="somestageurl"/>
</env>
<env name="dev">
<field name="urlFormat" value="somedevurl"/>
</env>
</section>
<section name="com.provider.notify.Config">
<env name="prod">
<field name="urlFormat" value="someotherprodurl"/>
</env>
<env name="stage">
<field name="urlFormat" value="someotherstageurl"/>
</env>
<env name="dev">
<field name="urlFormat" value="someotherdevurl"/>
</env>
</section>
</config>
```

FIG. 5

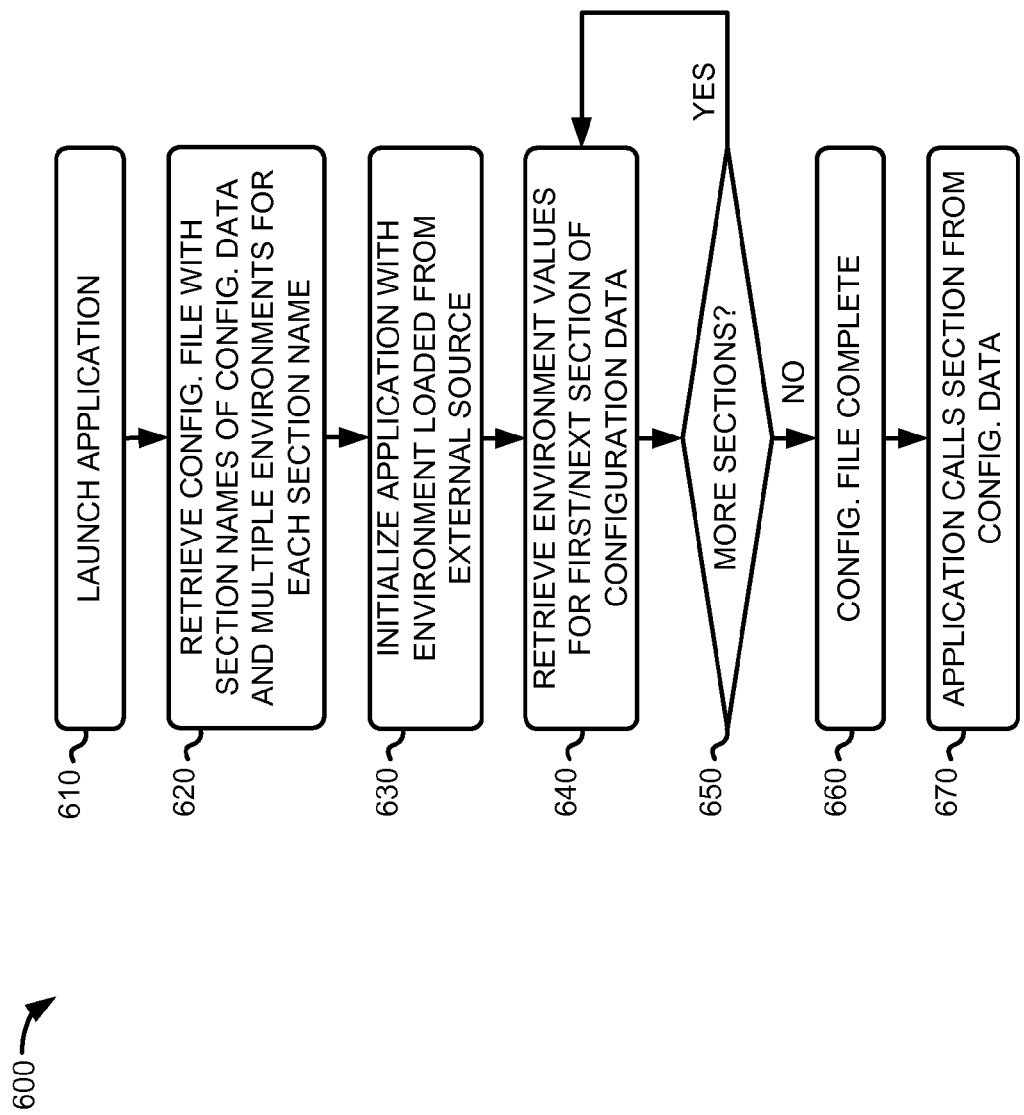

MOBILE APPLICATION CONFIGURATION

BACKGROUND

Application software, also referred to as an "app," is computer software designed to help a user perform one or more specific tasks. Apps may be downloaded to perform particular tasks for mobile electronic devices (such as smartphones, tablets, multimedia players, gaming systems, etc.) or computing systems (personal computers, laptops, etc.). When developing software code for an application, the application code is typically executed within different environments during different test stages to facilitate testing and more effectively isolate problems.

BRIEF DESCRIPTION OF THE DRAWINGS

FIG. 4 is a diagram of an exemplary storage format for configuration data of FIG. 3;

FIG. 5 is a sample XML code segment for defining multiple sections and environments for the configuration data of FIG. 3; and FIGS. 6 and 7 are flow charts of an example process for configuring an application for one of multiple environments according to implementations described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide for consistent storage of data that an application will need to run and may allow that data to be varied when testing the application in various environments. In one implementation, a user device may receive a mobile application that defines multiple environments associated with the mobile application and may launch the mobile application. After launching the mobile application, the user device may retrieve an environment selector value for the mobile application. The environment selector value may be retrieved from a different memory location than that of the mobile application and may identify a particular environment of the multiple environments. The user device may initialize the mobile application with configuration data for a particular environment of the multiple environments.

Figure 1:
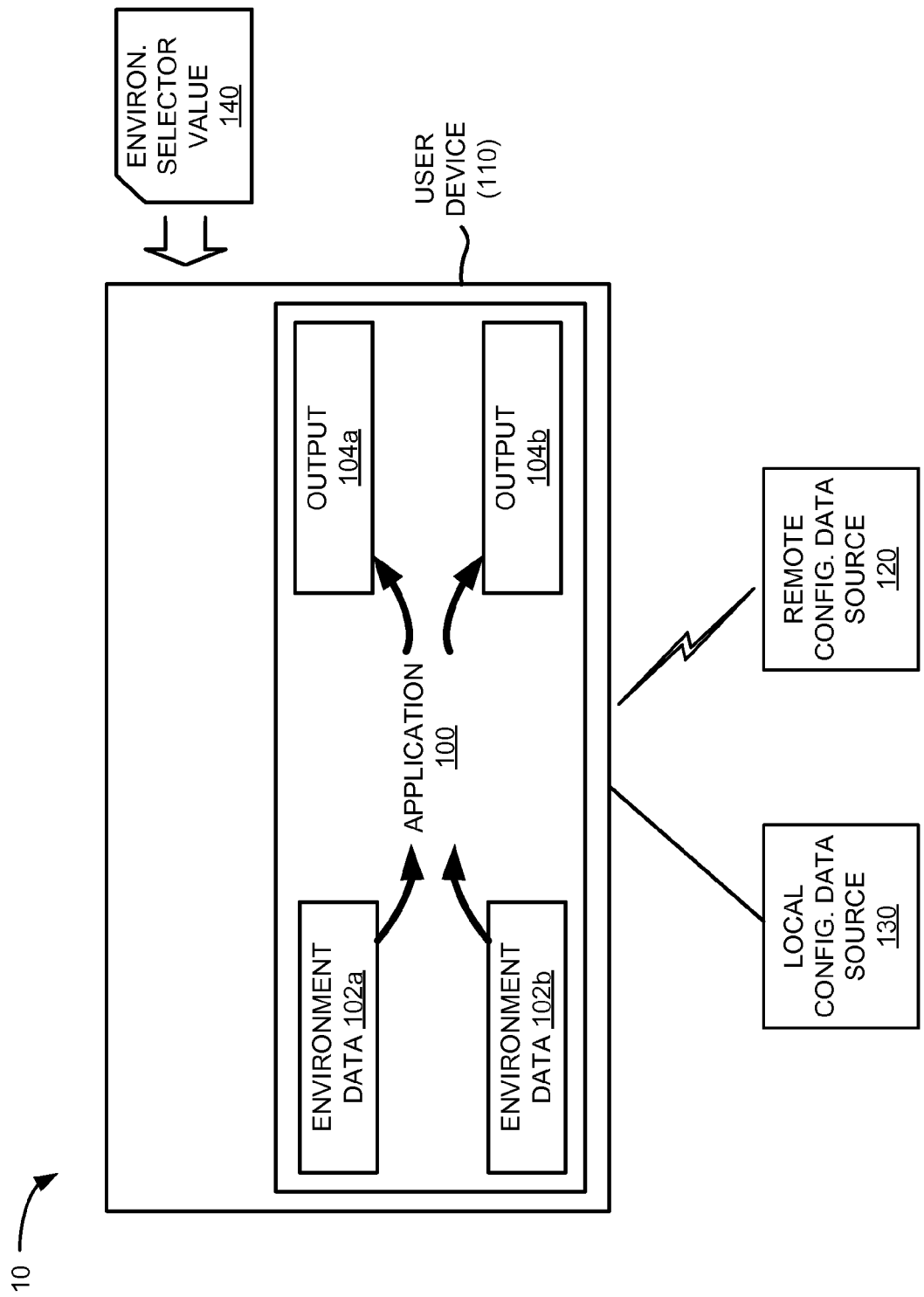
FIG. 1 illustrates concepts described herein.

FIG. 1 illustrates concepts described herein. As shown in FIG. 1, an environment 10 may include an application 100 residing on a user device 110, a remote configuration data source 120; and a local configuration data source 130.

User device 110 may include one or more devices capable of storing/executing applications and sending/receiving information (e.g., voice, data, broadband applications, etc.). User device 110 may include, for example, a tablet computer, a smart phone, a personal communications system (PCS) terminal (e.g., that may combine a cellular radiotelephone with data processing and data communications capabilities), a wireless device (e.g., a wireless telephone), a laptop computer (e.g., with a broadband air card), a portable gaming system, a music playing device, or other types of mobile communication devices. In other implementations, user device 110 may include a fixed computing device, such as a personal computer or a set-top box (STB). User device 110 may include one or more stored applications with various functionalities, such as functionalities associated with travel, traffic, weather, social media, dictionary/reference, currency/mathematical conversions, sports scores, news, etc.

In one implementation, user device 110 may store and execute a particular type of application 100 that includes a data structure for storing, on user device 110, configuration data related to the particular application. For example, application 100 may cause user device 110 to define a data structure that includes sections of configuration data and multiple sets of environment data 102a, 102b associated with the sections. Application 100 may be used in a variety of environments. After application 100 is compiled and stored on user device 110, application 100 may retrieve instructions for which set of environment data 102a/102b to use when initializing application 100. Environment data 102a/102b may generally include data an application needs to execute on user device 110, such as where relevant files are to be retrieved from and stored. For example, environment data 102a, 102b may include universal resource locators (URL) for particular files associated with application 100. In one implementation, the instructions for which set of environment data 102a/102b to use may be obtained from environment selector value 140.

Remote configuration data source 120 may include one or more server devices, network devices, or other types of computation or communication devices, that gather, process, search, and/or provide information in a manner described herein. In one implementation, remote configuration data source 120 may include a web server that supplies web services for use by user device 110. Remote configuration data source 120 may dynamically generate/provide configuration data for customers or developers accessing remote configuration data source 120. In particular, consistent with aspects described herein, remote configuration data source 120 may transmit data (e.g., configuration data for particular applications) and/or scripts (e.g., JavaScript, VBScript, or other computer code) to user device 110. In one implementation, user device 110 may access data from remote configuration data source 120 via a network or combination of networks, including, for example, the Internet.

Local configuration data source 130 may include one or more server devices, network devices, or other types of computation or communication devices, that gather, process, search, and/or provide information in a manner described herein. In one implementation, local configuration data source 130 may include a local computing device that supplies configuration data for use by user device 110. For example, local configuration data source 130 may provide sample configuration data used for various stages of software testing, such as a stage test environment or a development test environment for application 100. In one implementation, user device 110 may access data from local configuration data source 130 via a direct connection or a local area network (LAN).

Environment selector value 140 may include a string, text file, or another form of data to identify a particular environment (e.g., an environment supported by application 100). Environment selector value 140 may be stored, for example, in a memory location that is separate from a memory storing application 100. For example, environment selector value 140 may be stored on a memory card (e.g., a microSD card), a USB-connected device, or another external memory device that can be read by user device 110. In another implementation, application 100 may include a prompt to enable a user to select a particular environment selector value 140 from a list of possible environments supported by application 100.

In operation, user device 110 may initialize application 100 with configuration data for a particular environment, from the multiple environments, based on the value of environment selector value 140. Output 104a/104b may include information presented to a user based in part on environment data 102a/102b. Remote configuration data source 120 and local configuration data source 130 may include configuration files that application 100 uses to execute. For example, if application 100 is compiled with environment data 102a, application 100, when executed, may retrieve configuration data from the particular location indicated in environment data 102a (e.g., remote configuration data source 120) and generate output 104a. Conversely, if application 100 is compiled with environment data 102b, application 100, when executed, may retrieve data from a different location indicated in environment data 102b (e.g., local configuration data source 130) and generate output 104b. Data from remote configuration data source 120 and local configuration data source 130 may include different, overlapping, or identical data.

In one implementation, environment data 102a and 102b may be selected to differentiate between different environments, such as different software test environments. Thus, environment data 102a may represent a stage test environment that identifies files to be retrieved from a local location (e.g., a physically connected, such as local configuration data source 130) to better control test conditions. In contrast, environment data 102b may represent systems integration test environment that identifies files to be retrieved from remote servers (e.g., a remote web server, such as remote configuration data source 120) to test actual production conditions.

In conventional software testing, modifying environment data (e.g., switching between environment data 102a and 102b) requires changing software code for application 100 to reflect the updated environment and recompiling the software code. Recompiling the software can introduce inconsistencies into the various code versions. By contrast, in implementations described herein, application 100 may include a module that maps to multiple environments (e.g., environment data 102a and 102b) based on the environment selector value 140 retrieved from a source outside application 100. Environment selector value 140 may include an indicator for one of the multiple environments (e.g., environment data 102a and 102b) supported by application 100. Application 100 may set the environment (e.g., by applying only one of environment data 102a and 102b, based on environment selector value 140) before application 100 is executed.

Although FIG. 1 shows example components of environment 10, in other implementations, environment 10 may contain fewer components, different components, differently arranged components, or additional components than depicted in FIG. 1.

Figure 2:
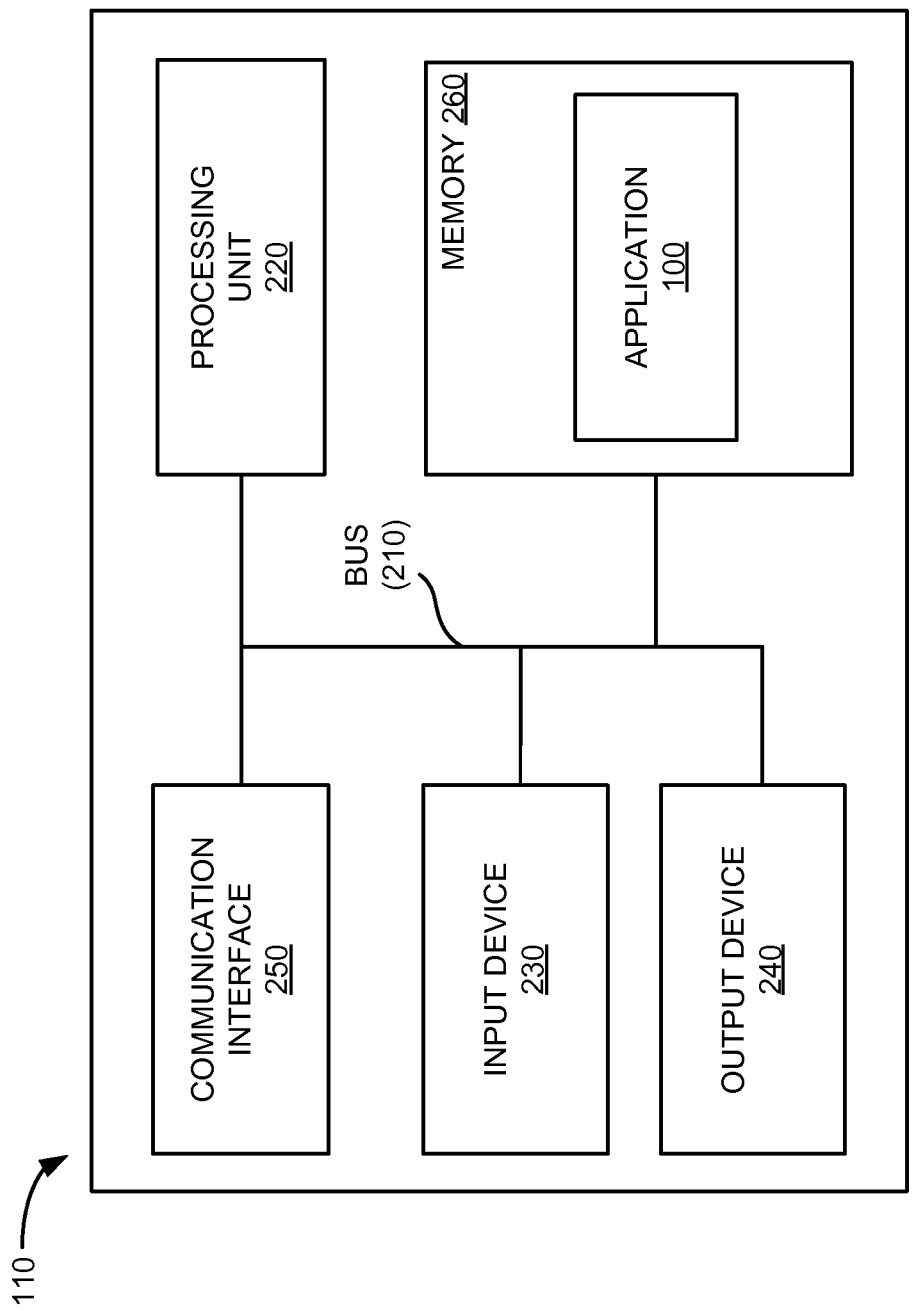
FIG. 2 is a diagram of exemplary components of a user device of FIG. 1.

FIG. 2 is a block diagram of exemplary components of a user device 110. User device 110 may include a bus 210, processing unit 220, an input device 230, an output device 240, a communication interface 250, and a memory 260. User device 110 may include other components (not shown) that aid in receiving, transmitting, and/or processing data. Moreover, other configurations of components in user device 110 are possible.

Bus 210 may include a path that permits communication among the components of user device 110. Processing unit 220 may include any type of processor or microprocessor (or groups of processors or microprocessors) that interprets and executes instructions. In other embodiments, processing unit 220 may include an application-specific integrated circuit (ASIC), a field-programmable gate array (FPGA), or the like.

Input device 230 may include a device that permits a user to input information into user device 110, such as a keyboard, a mouse, a pen, a remote control, a touch-screen display, etc. Output device 240 may include a device that outputs information to the user, such as a display, a speaker, etc. Output device 240 may also include a vibrator to alert a user.

Input device 230 and output device 240 may allow the user to activate a particular service or application, such as a visual voicemail application and/or service. Input device 230 and output device 240 may allow the user to receive and view a menu of options and select from the menu options. The menu may allow the user to select various functions or services associated with applications executed by user device 110.

Communication interface 250 may enable user device 110 to communicate with other devices and/or systems. Communication interface 250 may include a transmitter that may convert baseband signals to radio frequency (RF) signals and/or a receiver that may convert RF signals to baseband signals. Alternatively, communication interface 250 may include a transceiver to perform functions of both a transmitter and a receiver. Communication interface 250 may be coupled to an antenna for transmission and reception of the RF signals. Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface for communicating with Bluetooth devices, a near-field communication (NFC) interface, etc. Communication interface 250 may implement a wireless communication protocol, e.g., LTE, GSM, CDMA, WCDMA, GPRS, EDGE, etc. Communication interface 250 may also receive, transmit and/or process digital or analog audio inputs/outputs and/or digital or analog video inputs/outputs.

Memory 260 may include a random access memory (RAM) or another type of dynamic storage device that may store information and instructions, e.g., an application, for execution by processing logic 220; a read-only memory (ROM) device or another type of static storage device that may store static information and instructions for use by processing unit 220; and/or some other type of magnetic or optical recording medium and its corresponding drive (e.g., a hard disk drive (HDD), flash drive, etc.), for storing information and/or instructions. Consistent with implementations described herein, memory 260 may include application 100 that allows configuration data to be varied when testing the application in various environments.

As described herein, user device 110 may perform certain operations in response to processing unit 220 executing software instructions contained in a computer-readable medium, such as memory 260. A computer-readable medium may include a non-transitory memory device. A memory device may include space within a single physical memory device or spread across multiple physical memory devices. The software instructions may be read into memory 260 from another computer-readable medium or from another device via communication interface 250. The software instructions contained in memory 260 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of user device 110, in other implementations, user device 110 may contain fewer components, different components, differently arranged components, or additional components than depicted in FIG. 2. Alternatively, or additionally, one or more components of user device 110 may perform one or more other tasks described as being performed by one or more other components of user device 110.

Figure 3:
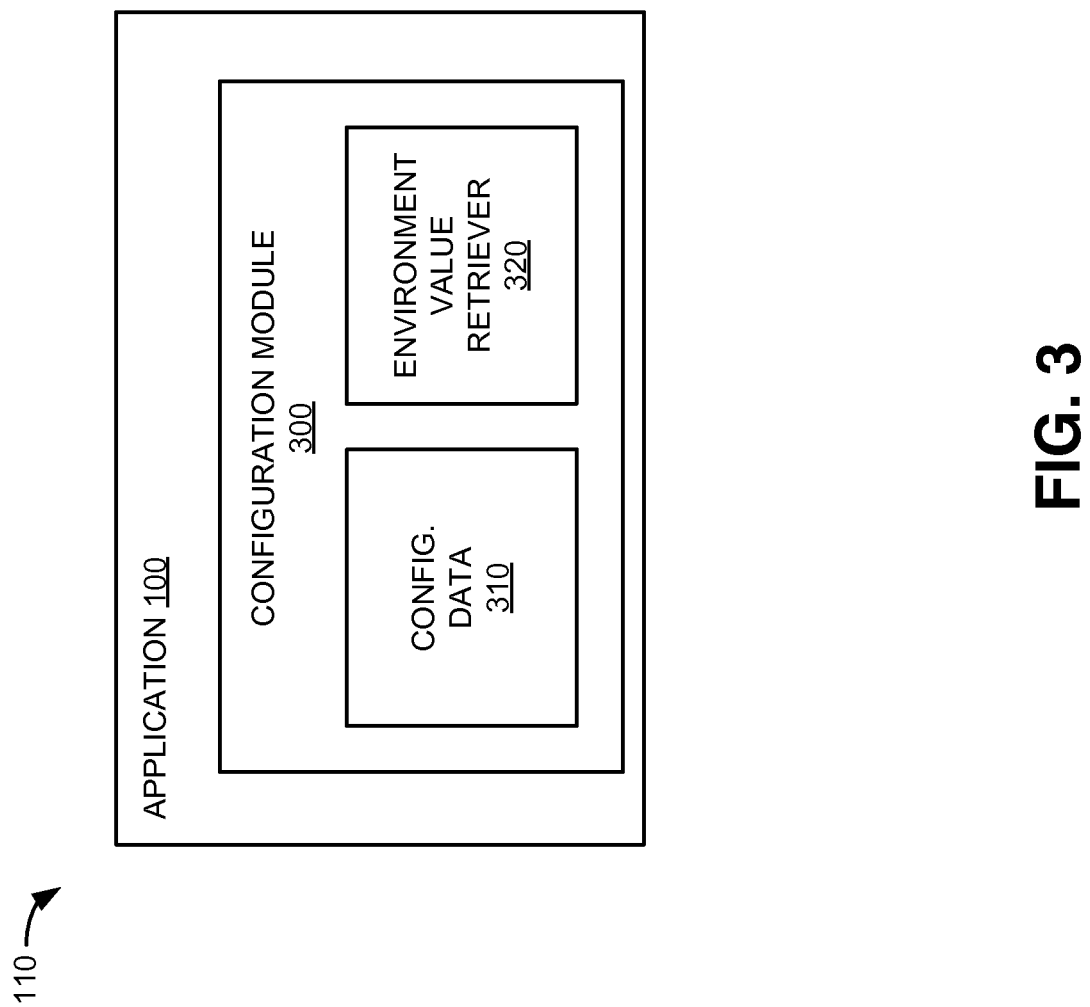
FIG. 3 is a diagram of exemplary functional components of the user device depicted in FIG. 1.

FIG. 3 is a diagram of example functional components of user device 110. In one implementation, the functions described in connection with FIG. 3 may be performed by one or more components of user device 110 illustrated in FIG. 2. As shown in FIG. 3, user device 110 may include application 100, including configuration module 300. Configuration module 300 may include configuration data 310 and an environment value retriever 320.

Configuration module 300 may configure application 100 to run against different environments based on an external environment value. Configuration data 310 may include a defined format (e.g., an XML format) for storage of configuration data that includes and may permit use of different data based on a selected environment. Formats for configuration data 310 are described further in connection with FIGS. 4 and 5 below.

Environment value retriever 320 may retrieve an environment selector value (e.g., environment selector value 140) from outside application 100. For example, environment value retriever 320 may scan one or more locations for identified environmental selector value 140. Environment selector value 140 may be, for example, included in a removable memory device, input into a local memory, accessed via a URL, etc. Environmental selector value 140 may include any of a variety of formats or indicators to denote a particular environment. In one implementation, environmental selector value 140 may be included in a text file (e.g., having a designated naming configuration) and include a simple text string (e.g., "prod," "dev," etc.). Configuration module 300 may apply the environment selector value to configuration data 310 to select particular configuration data for application 100. In instances where environment value retriever 320 is unable to retrieve a particular environment selector value, configuration module 300 may simply default to a pre-determined environment, such as a production (e.g., non-testing) environment.

For example, a user (or another application running on user device 110) may cause user device 110 to launch application 100 that includes configuration module 300. Configuration module 300 may retrieve a formatted structure (e.g., configuration data 310) that defines one or more sections and multiple environments for each section. Configuration module 300 may identify a particular section name in the configuration data and associate, based on the retrieved environment selector value, a particular environment field from the multiple environments. In one implementation, the particular section and the particular environment field may be included in a hash map that associates each section name with data for the active environment.

After configuration module 300 populates the hash map with an environment field for each section, user device 110 may begin executing (running) application 100. Application 100 may call for data based on particular sections, and data corresponding to the called section may reflect a particular environment. Thus, application 100 may be developed and compiled without reference to a specific environment. Instead, the environment may be selected and implemented when the application is launched.

Although FIG. 3 shows example functional components of user device 110, in other implementations, user device 110 may contain fewer functional components, different functional components, differently arranged functional components, or additional functional components than depicted in FIG. 3. Alternatively, or additionally, one or more functional components of user device 110 may perform one or more other tasks described as being performed by one or more other functional components of user device 110.

FIG. 4 is a diagram of an exemplary storage format for configuration data 310. As shown in FIG. 4, configuration data 310 may include multiple sections 400 (e.g., "section 1" and "section 2") each including multiple environments 410 (e.g., "environment A," "environment B," and "environment C"). Two sections each containing three environments are shown in FIG. 4 for simplicity. In other implementations, more or fewer sections/environments may be used.

Each section 400 may refer to a specific class of configuration data categorized, for example, by a particular module or function. For example, one section 400 (e.g., "section 1") may be assigned to advertising data, while another section 400 (e.g., "section 2") may be assigned to notification information. Sections 400 may also be used to distinguish, for example, between machine-readable information (e.g., a URL) and human-readable information (e.g., conventional text).

A set of environments 410 may be defined for each section 400 of configuration data 310. Environments 410 may reflect, for example, different data sets associated with different test environments. For example, in the context of software testing, a different environment may be defined for a systems integration test, a production test, a stage test, and/or a development test. In one implementation, each environment 410 may be associated with a different data location for configuration data associated with a particular section 400. For example, within one section 400 (e.g., "section 1"), one environment 410 (e.g., "environment A") may include a URL for a data file from a local server, while another environment 410 (e.g., "environment B") may include a URL for a remote web server. As another example, within another section 400 (e.g., "section 2"), one environment 410 (e.g., "environment A") may include an email address for an automatically generated message, while another environment 410 (e.g., "environment B") may include a different email address for the message.

The application (e.g., application 100) can utilize the configuration data by accessing properties of the named section 400. Configuration module 300 may load the environment selector value 140 (e.g., defined outside of the application and retrieved by environment value retriever 320). In this way, an external application can be used to set the environment value before the application is executed.

FIG. 5 includes a sample XML code segment for defining multiple sections and environments for configuration data 310. In the example of FIG. 5, the sections have been named to direct configuration module 300 to load configuration data into the named section. In the code section of FIG. 5, one section may be called "com.provider.ads.Config," which may correspond to a data source for advertisements. Another section may be called "com.provider.auth.Config," which may correspond to authentication information. As further shown in FIG. 5, three environments—"prod," "stage," and "dev"— are named under each section. Thus, selection of a particular environment (e.g., "stage," as indicated in environment selector value 140) may cause configuration module 300 to associate section "com.provider.ads.Config" with "somestageurl" and to associate section "com.provider.notify.Config" with "someotherstageurl."

FIG. 6 is a flow chart of an example process 600 for configuring an application for one of multiple environments according to implementations described herein. In one implementation, process 600 may be performed by user device 110. In another implementation, some or all of process 600 may be performed by another device or group of devices, including or excluding user device 110.

As illustrated in FIG. 6, process 600 may include launching a mobile application (block 610) and retrieving a configuration file that includes section names of configuration data and multiple environments for each section name (block 620). For example, in implementations described above in connection with FIG. 4, user device 110 may launch an application (e.g., based on input from a user or from another application). The application may include a configuration module, such as configuration module 300. Configuration module 300 may retrieve a formatted structure (e.g., configuration data 310) that defines one or more sections and multiple environments for each section.

Returning to FIG. 6, process 600 may include initializing the application with an environment loaded from an external source (block 630). For example, in implementations described above in connection with FIG. 4, configuration module 300 (e.g., environment value retriever 320) may retrieve an environment value from outside the application data.

As further shown in FIG. 6, process 600 may include retrieving environment values for a first section of the configuration data (block 640) and determining if there are more sections of configuration data (block 650). For example, in implementations described above in connection with FIG. 4, configuration module 300 may identify a particular section name in the configuration data and associate, based on the retrieved environment value, a particular environment field from the multiple environments. In one implementation, the particular section and the particular environment field may be included in a hash map that associates each section name with data for the active environment.

If there are more sections of configuration data (block 650—YES), then process 600 may return to block 640 to retrieve environment values for a next section of the configuration data. If there are no more sections of configuration data (block 650—NO), the configuration file may be deemed complete (block 660), and calls from the application, directed to a particular section, may be provided with values for the active environment (block 670). For example, in implementations described above in connection with FIG. 4, after a hash map has been populated with an environment field for each section, user device 110 may begin executing (running) the application. Application 100 may call for data based on particular sections, and data corresponding to the called section may reflect a particular environment. Thus, application 100 may be developed and compiled without reference to a specific environment. Instead, the environment may be selected and implemented when the application is launched.

Figure 7:
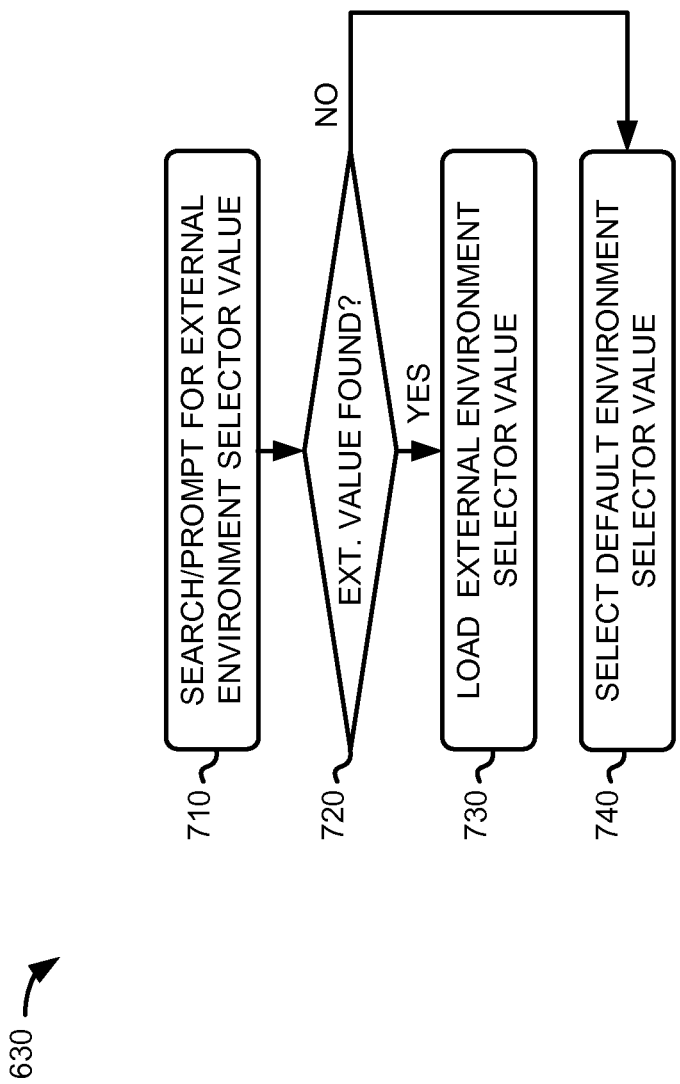

Process block 630 may include the process blocks shown in FIG. 7. As shown in FIG. 7, process block 630 may include searching and/or prompting for an external environment selector value (block 710). For example, if application 100 includes one or more default locations from which to obtain an external environment selector value (e.g., environment selector value 140), application 100 may search the default location(s) for the environment selector value. In one implementation, environment selector value may be stored in an external memory card (e.g., micro SD card), a USB-connected memory component, or another external memory device. Alternatively, application 100 may cause user device 110 to prompt a user for either a particular location or for a particular environment (e.g., from a menu of possible environments supported by application 100).

If an external environment selector value is found (block 720—YES), application 100 may load and temporarily store the particular environment selector value (block 730). Process block 630 may return to process 600 to apply the environment associated with the particular environment selector value.

If an external environment selector value is not found (block 720—NO), application 100 may load a particular default environment selector value (block 740). For example, application 100 may include instructions to default to a particular environment, such as a production environment, when an external environment selector value is not (or cannot) be loaded. Thus, for example, if application 100 is configured to retrieve an environment selector value from a microSD card inserted in user device 110, and no card is inserted (or no environment selector value is recognized on the card), application 100 may assign the default environment selector value.

Systems and/or methods described herein may define a data structure for a mobile application that includes sections of configuration data and multiple environments associated with the sections. Upon launching the mobile application, the systems and/or methods may retrieve an environment selector value for the mobile application and may initialize the mobile application with configuration data for a particular environment of the multiple environments. The particular environment may be selected from the multiple environments based on the environment selector value.

The systems and/or methods may permit applications to be compiled without a known environment value. Instead, the application may read in correct environment values to reflect the correct environment at runtime based on an external environment value. Therefore, developers can build an application one time and run it against different external environments based on the external environment value. Furthermore, the systems and/or methods may the application to utilize configuration data by accessing properties of a named section, regardless of the particular environment being used by the application at the time.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described in connection with FIGS. 6 and 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as an ASIC or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
    receiving, by a user device, a mobile application wherein the mobile application has a configuration module that includes a formatted structure that defines multiple sections of configuration data and fields corresponding to multiple software test environments within each section of the multiple sections, wherein each of the multiple software test environments indicates from where to retrieve files relevant to executing the mobile application, and wherein the mobile application includes software code compiled without reference to a specific software test environment of the multiple software test environments;
    launching, by the user device, the mobile application;
    retrieving, by the user device and after the launching, an environment selector value indicating a particular software test environment of the multiple software test environments for the mobile application;
    generating, by the user device and from the configuration module, configuration data for the mobile application, wherein the configuration data associates each section of the multiple sections with one of the multiple fields based on the environment selector value; and
    initializing, by the user device, the mobile application for the particular software test environment using the configuration data and without recompiling the software code.

2. The method of claim 1, wherein generating the configuration data for the mobile application further comprises:
    associating each section and one of the multiple fields in a hash map.

3. The method of claim 1, wherein the multiple software test environments include two or more of:
    a production test environment,
    a stage test environment, and
    a development test environment.

4. The method of claim 1, wherein each of the multiple fields for at least one section of the multiple sections includes a universal resource locator (URL) from which the mobile application is to retrieve the configuration data, associated with each of the multiple software test environments, and wherein each URL is different for each software test environment.

5. The method of claim 1, wherein retrieving the environment selector value for the mobile application includes:
    retrieving the environment selector value from a data source that is external to the mobile application.

6. The method of claim 5, wherein the data source that is external to the mobile application resides on a separate memory component than that of the mobile application.

7. The method of claim 1, further comprising:
    temporarily storing, by the mobile application, the environment selector value.

8. The method of claim 1, wherein the mobile application utilizes the configuration data by accessing each named section, regardless of the particular environment selector.

9. A non-transitory computer-readable medium, including instructions executable by at least one processor, the computer-readable medium comprising one or more instructions for:
    storing a mobile application wherein the mobile application has a configuration module that includes a formatted structure that defines multiple sections of configuration data and fields corresponding to multiple software test environments within each section of the multiple sections, wherein each of the multiple software test environments indicates from where to retrieve files relevant to executing the mobile application, and wherein the mobile application includes software code compiled without reference to a specific software test environment of multiple software test environments;
    launching the mobile application;
    retrieving, after the launching, an environment selector value indicating a particular software test environment of the multiple software test environments for the mobile application;
    generating, from the configuration module, configuration data for the mobile application, wherein the configuration data associates each section of the multiple sections with one of the multiple fields based on the environment selector value; and
    initializing the mobile application with the configuration data for the particular software test environment of the multiple software test environments and without recompiling the software code.

10. The non-transitory computer-readable medium of claim 9, wherein the multiple software test environments include different universal resource locators (URLs) from which the mobile application is to retrieve the configuration data.

11. The non-transitory computer-readable medium of claim 9, wherein the multiple software test environments include:
    a production test environment for the mobile application,
    a stage test environment for the mobile application, or
    a development test environment for the mobile application.

12. The non-transitory computer-readable medium of claim 9, wherein the one or more instructions for retrieving an environment selector value include:
    one or more instructions for retrieving the environment selector value from a data source that is external to the mobile application.

13. The non-transitory computer-readable medium of claim 12, wherein the data source that is external to the mobile application resides on a separate memory component than that of the mobile application.

14. The non-transitory computer-readable medium of claim 9, further comprising one or more instructions for:
    retrieving, for the mobile application, the configuration data for the particular software test environment.

15. The non-transitory computer-readable medium of claim 14, further comprising one or more instructions for:
    storing, in a memory, the configuration data associated with a particular section of the sections of the configuration module.

16. The non-transitory computer-readable medium of claim 9, wherein the configuration module for the mobile application include Extensible Markup Language (XML)-based code.

17. A user device, comprising:
a memory to store a plurality of instructions; and
a processor to execute the instructions in the memory to:
   store, in the memory, a mobile application wherein the mobile application has a configuration module that includes a formatted structure that defines multiple sections of configuration data and fields corresponding to multiple software test environments within each section of the multiple sections, wherein each of the multiple software test environments indicates from where to retrieve files relevant to executing the mobile application, and wherein the mobile application includes software code compiled without reference to a specific software test environment of the multiple software test environments,
   launch the mobile application,
   access, from a memory location, an environment selector value, wherein the environment selector value includes an indicator for one of the multiple software test environments,
   apply the environment selector value to generate, from the configuration module, configuration data for a particular software test environment, of the multiple software test environments, for the mobile application, wherein the configuration data for a particular software test environment associates each section with one of the multiple fields based on the environment selector value, and
   initialize the mobile application with the configuration data for the particular software test environment and without recompiling the software code.

18. The user device of claim 17, wherein the processor is further to execute instructions in the memory to:
   store, in a second memory location, the configuration data for the particular software test environment.

19. The user device of claim 17, wherein, when accessing the environment selector value, the processor is further to execute instructions in the memory to:
   access the environment selector value from a removable memory component of the user device.

20. The user device of claim 17, wherein the multiple fields include different universal resource locators (URLs) from which the mobile application is to retrieve the configuration data.

* * * * *